US005590184A

United States Patent [19]
London

[11] Patent Number: 5,590,184
[45] Date of Patent: Dec. 31, 1996

[54] COMMUNICATIONS PRIVACY PROTECTION SYSTEM BY REPLACING CALLING PARTY NUMBER WITH NON-ASSIGNED NUMBER

[75] Inventor: Thomas B. London, Tinton Falls, N.J.

[73] Assignee: Lucent Technologies Inc., Murray Hill, N.J.

[21] Appl. No.: 398,251

[22] Filed: Mar. 3, 1995

[51] Int. Cl.[6] .......................... H04M 1/56; H04M 15/00; H04M 3/42; H04M 3/00
[52] U.S. Cl. .......................... 379/142; 379/213; 379/245
[58] Field of Search .................................... 379/127, 142, 379/201, 213, 245, 196, 197, 199; 370/170.1

[56] References Cited

U.S. PATENT DOCUMENTS

| | | | |
|---|---|---|---|
| 5,033,076 | 7/1991 | Jones et al. | 379/142 |
| 5,161,181 | 11/1992 | Zwick | 379/142 |
| 5,278,894 | 1/1994 | Shaw | 379/142 |
| 5,289,542 | 2/1994 | Kessler | 379/142 |
| 5,333,185 | 7/1994 | Burke et al. | 379/142 |
| 5,341,411 | 8/1994 | Hashimoto | 379/142 |
| 5,426,693 | 6/1995 | Rosen | 379/142 |
| 5,475,744 | 12/1995 | Ikeda | 379/142 |
| 5,521,969 | 5/1996 | Paulus et al. | 379/142 |

*Primary Examiner*—Wellington Chin
*Assistant Examiner*—Paul Loomis

[57] ABSTRACT

A telephone subscriber of a privacy communications service is allowed to use a randomly selected non-assigned telephone number—instead of the subscriber's real telephone number—as a return phone number in a telephone message left for a called party. The non-assigned, randomly selected telephone number becomes inoperative after a threshold that may be pre-imposed by the subscriber is exceeded. According to a feature of the invention, the function of randomly selecting a non-assigned telephone number may also include replacing the calling party number with the randomly selected number. Hence, when a caller-id display unit receives the telephone number of an incoming call for which the privacy communications service is used, the randomly selected telephone number—as opposed to the real telephone number—is received and recorded by the caller-id display unit.

22 Claims, 5 Drawing Sheets

FIG. 2

| PORT NUMBER | LINE IDENTIFICATION NUMBER | CALLING PARTY NUMBER |
|---|---|---|
| 1 | 120 | 555-1234 |
| 2 | 130 | 555-6789 |
| 3 | 600 | 555-5678 |
| ⋮ | ⋮ | ⋮ |
| N | 900 | 555-9999 |

FIG. 3

| CALLING PARTY NUMBER | TEMPORARY PRIVATE NUMBER SERVICE | CONVERSION SERVICE | PRESUBSCRIBED CONDITIONS PARAMETERS | |
|---|---|---|---|---|
| | | | SOURCE ONLY FLAG | THRESHOLD FOR RECEIVED CALLS |
| 555-1234 | YES | YES | YES | 4 |
| 555-6789 | YES | NO | NO | 6 |
| ⋮ | ⋮ | ⋮ | ⋮ | ⋮ |
| 555-7890 | YES | YES | NO | 5 |

| CUSTOMIZED ROUTING BLOCK TABLE ||
| TEMPORARY PRIVACY NUMBER | REAL TELEPHONE NUMBER |
| --- | --- |
| (201)555-2332 | 555-0123 |
| (201)555-9876 | 555-6789 |
| (201)949-0000 | 870-9999 |

501　502

COMMUNICATIONS PRIVACY PROTECTION SYSTEM BY REPLACING CALLING PARTY NUMBER WITH NON-ASSIGNED NUMBER

TECHNICAL FIELD

This invention relates to communications systems and more particularly to a method and a system for protecting the privacy of communications services users.

BACKGROUND OF THE INVENTION

Voice messaging systems, such as answering machines and the like, allow a caller to leave a message for a called party who is unavailable. Typically, a message prerecorded on a voice messaging system invites a caller to provide a telephone number to which a return call can be directed. Too often, callers who are concerned about their loss of privacy face the dilemma of choosing between their desire for a return call from the called party, and their reluctance to divulge their personal phone number to the called party (and/or all other potential listeners of the message recorded on the voice messaging system). For example, when a physician calls a patient from his home, the physician may not want to "publicize" his home phone number in a recorded (or non-recorded) message when the patient is unavailable. Security reasons may also prevent a caller from leaving his or her phone number in a message, notwithstanding the caller's great desire to be called back by the unavailable called party.

Unfortunately, callers' actions (or lack thereof) to protect their privacy, such as their refusal to leave a message, are sometimes defeated by factors that are independent of their will. For example, when an answering machine is coupled to a caller identification display unit (referred to as "caller-id display" for short) that records and displays originating telephone numbers for incoming calls, the caller's refusal to leave a message is unavailing. In response to this problem, a particular standard has been included in the Integrated Services Digital Network (ISDN) set of standards to allow callers to mark their telephone number as "Private Presentation Restricted" for their outgoing calls. Implementation of that particular ISDN standard effectively prevents called parties from receiving telephone numbers associated with incoming calls. Unfortunately, broad public acceptance of ISDN-based products and services has been slower than anticipated due to their relatively high cost compared to Plain Old Telephone Service (POTS) or POTS-based end-user telecommunications devices. As a result, the standard for preventing the display of originating telephone numbers on a per-call basis has not been widely implemented. Thus, a problem of the prior art is lack of a simple and cost-effective mechanism that allows callers with POTS lines (or ISDN lines) to protect their privacy without restraining their use of communications services.

SUMMARY OF THE INVENTION

The present invention is directed to a system which allows telephone subscribers to use temporary private telephone numbers—instead of their real phone numbers—as return phone numbers in telephone messages left for called parties. The temporary private telephone numbers become inoperative after use thresholds for those numbers have been exceeded.

In an embodiment of the communications privacy service of the invention, when the telephone set of a privacy service subscriber goes off-hook, the communications system randomly selects a telephone number that has not previously assigned to any telecommunications service subscriber (hereinafter called a "non-assigned number"). The randomly selected telephone number is then displayed on a screen coupled to the caller's telephone set using, for example, the Analog Display Services Interface (ADSI) protocol or the ISDN protocol (depending on whether the telephone set is analog or digital). The randomly selected telephone number remains displayed until an on-hook signal is received by the central office switch. When the called party is unavailable, the randomly selected non-assigned telephone number may be used by the caller as a return telephone number in a telephone message left for the called party According to another aspect of the invention, the communications system replaces the calling party number associated with each call initiated by a privacy service subscriber with the randomly selected telephone number. Hence, when a caller-id box receives the originating telephone number for a call initiated by a privacy service subscriber, the randomly selected telephone number—as opposed to the subscriber's real telephone number—is received and recorded by the caller-id box.

In an alternative embodiment of the principles of the invention, the function of randomly selecting a non-assigned telephone number (also called a "temporary private number") may also be triggered (as a post-ringing operation) by the caller dialing a special two-digit number (such as *99) before a particular event, such as a voice messaging system emitting a "beep" tone. The randomly selected telephone number is forwarded to the caller either in-band (using ADSI protocols, for example) or out-of-band (using the D channel of a Basic Rate Interface of an ISDN connection, for example). The displayed randomly selected telephone number may be used by the caller as a return telephone number in a recorded message.

BRIEF DESCRIPTION OF THE DRAWINGS

In the drawings:

FIG. 2 illustrates a routing table that correlates a port number and a line identification number to a calling party number;

FIG. 3 depicts an illustrative subscriber record of a user of the privacy protection communications services of the invention;

DETAILED DESCRIPTION

Figure 1:
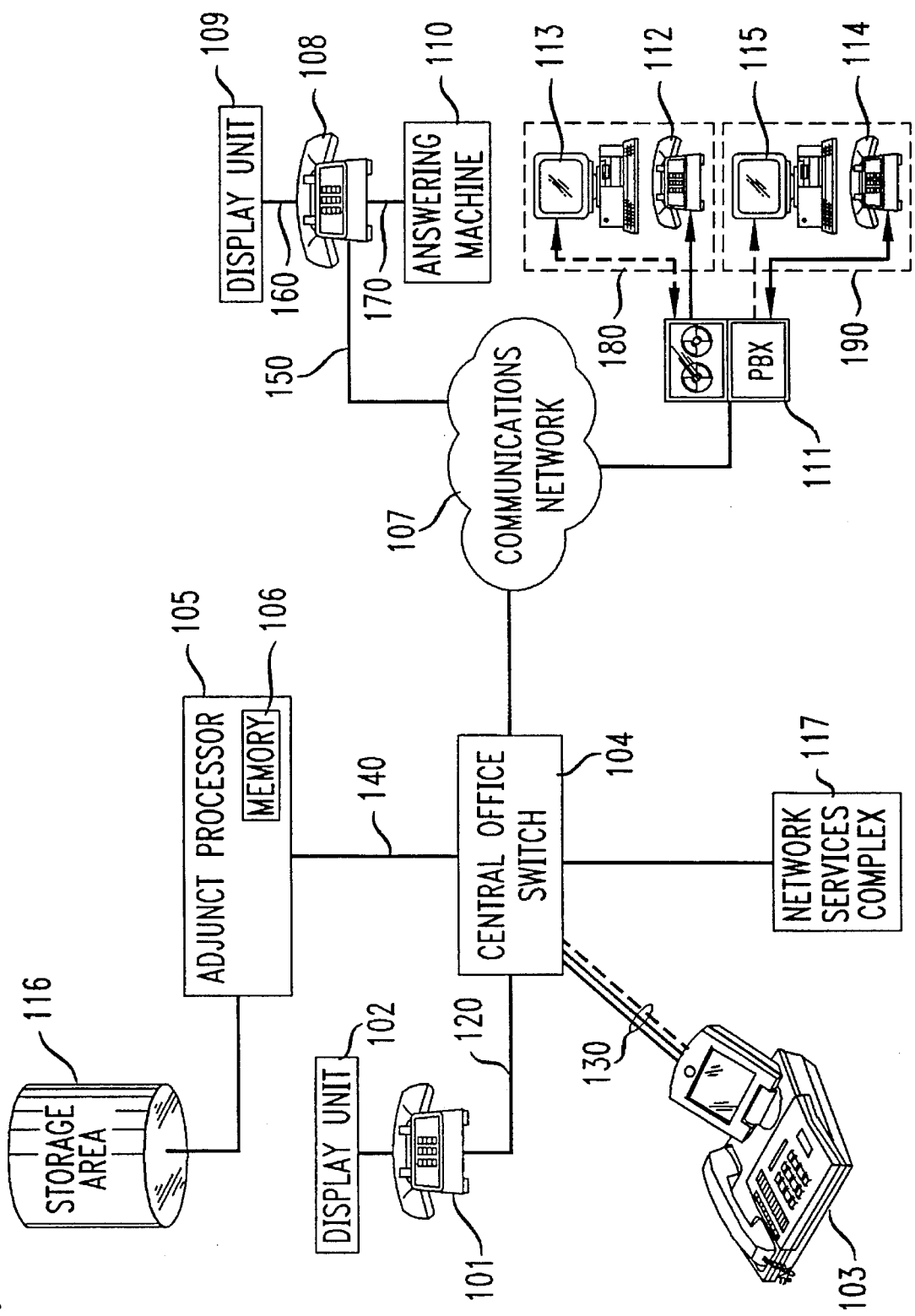
FIG. 1 shows in block diagram format a communications switching system arranged in accordance with the invention to select temporary private phone numbers for use as return numbers.

Shown in the block diagram of FIG. 1 is a communications switching system which includes a central office switch 104 that is connected to an adjunct processor 105 and a communications network 107. Central Office switch 104 is arranged to communicate with a) analog telephone sets, such as telephone set 101 using POTS facility 120, and b) digital end-user devices, such as digital telephone set 103 via ISDN facility 130. The latter is a Basic Rate Interface (BRI) loop which has two bearer (B) channels and one data (D) channel that carries signaling information for the bearer channels.

Switch 104 is also arranged to forward originating telephone numbers of incoming calls that are directed to telephone sets of subscribers of a service called "caller identification service". For an incoming call that is directed to analog telephone set 101, switch 104 delivers the originating telephone number associated with the call between the first ring and the second ring. Upon receiving the caller-id information, telephone set 101 proceeds to forward that information to display unit 102 which may be, for example, an AT&T Call Display 25 that is arranged to display and record caller id numbers for incoming calls. Similarly, analog telephone set 108 forwards caller-id information received from communications network 107 (via line 170) to display unit 109. When display unit 102 (109) adheres to the Analog Display Service Interface (ADSI) standards (developed and promoted by BellCore), display unit 102 (109) can also receive information via POTS loop 120 (150) even when telephone set 101 (108) is off-hook. The ADSI standards, for example, allow central office switch 104 to send limited information, such as signaling information, to an analog telephone set while a telephone number is being dialed at that set. Further information on the ADSI standards can be found in *"Generic Requirements for an SPCS to Customer Premises Equipment Data Interface for Analog Display Services"* BellCore Technical Reference (TR-NWT-001273), Issue 1, Dec. 1992. For ISDN telephone set 103, signaling information is received (as mentioned above) via the D channel (indicated by the broken line) of ISDN loop 130. Signaling information received by ISDN telephone set 103 is displayed on the screen of that set. Similarly, when a call and associated signaling information is received by PBX 111, the latter forwards the signaling information, such as the originating telephone number for the incoming call, to terminal 113 (115) via D channel 180 (190) while completing the call to telephone set 112 (114).

Central office switch 104 stores in its memory a routing table that is shown in FIG. 2 and that correlates a port number and a line identification number to a telephone number. Hence, when call set-up information for an outgoing call is received by switch 104 via a particular line (such as line 120) and through a particular port (such as port 1), switch 104 uses the routing table of FIG. 2 to identify the calling party number (555-1234, for example) associated with that call. Similarly, the routing table of FIG. 2 allows switch 104 to identify a particular port, such as port 2, and a particular line, such as line 130, to which a particular incoming call should be forwarded by mapping the called party number (555-6789, in this example) to the port and line identification numbers in the routing table.

Figure 6:
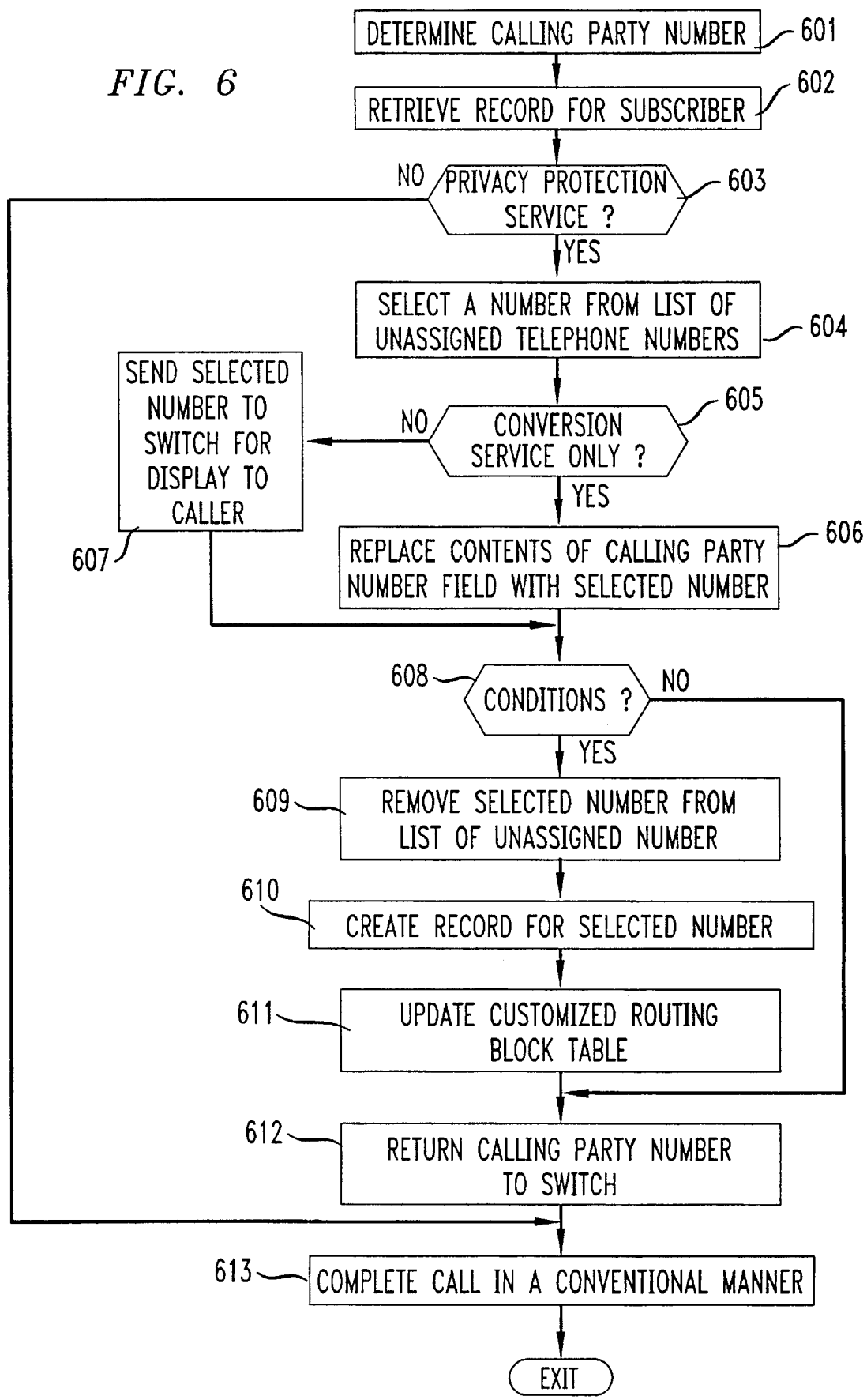
FIGS. 6 and 7 present in flow diagram format call processing instructions executed by different components of the network of FIG. 1 to provide privacy protection communications services in accordance with the invention.

Also connected to central office switch 104 is adjunct processor 105 which is a general purpose computer that executes instructions stored in memory 106. Those instructions include the number generating software and the call processing instructions illustrated in FIGS. 6 and 7. Additional data for use by adjunct processor 105 are contained in storage area 116, which keeps a log of all non-assigned telephone numbers within the exchange areas served by central office switch 104. The number generating software is designed to randomly select a temporary private telephone number from the list of non-assigned telephone numbers.

Whenever a temporary private telephone number is used by a caller as a return phone number, a record is created by adjunct processor 105. The record creation process may be triggered, for example, when the caller enters on the dialpad of telephone set 101 a string of digits preceded by a special character (such as #88).

Figures 4, 5:
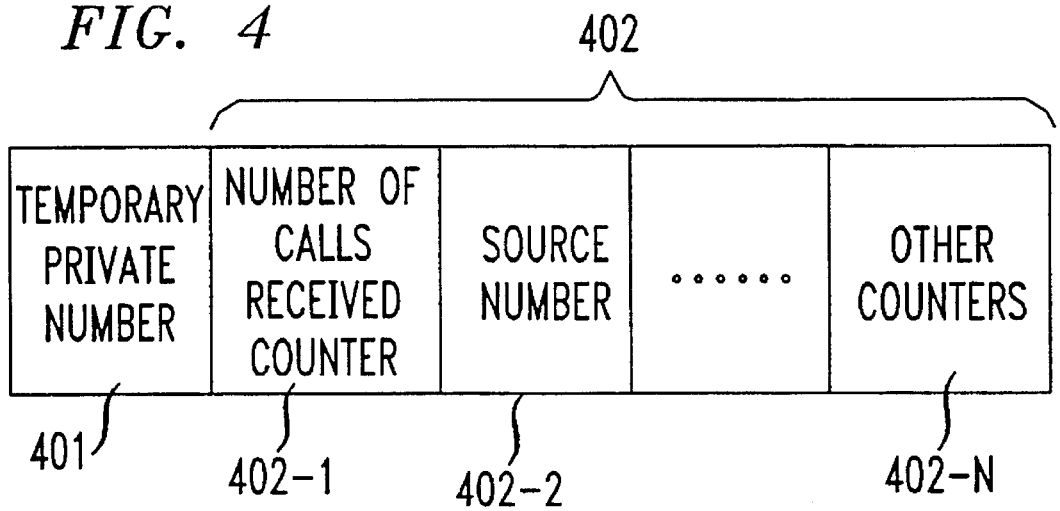
FIG. 4 shows an illustrative record for a temporary private number.
FIG. 5 is a customized routing block table that correlates a temporary private telephone number to the real telephone number of a called party.

An illustrative representation of one such record is shown in FIG. 4 which illustrates different fields that may be included in a record. Field 401 stores the temporary private telephone number that may be used as a search key to retrieve a record. Fields 402-1 to 402-N represent parameters that are used to assess whether certain conditions are satisfied before completing an incoming call for which the temporary private number in the record was dialed. When one of these conditions is not satisfied, adjunct processor 105 denies service to a caller who dialed the temporary private telephone number identified in the record. By way of example, a subscriber of the privacy protection service of the invention may wish to receive a limited number of return calls at the temporary private number. The counter in field 402-1 measures the number of calls received at the temporary private number. Another subscriber may prefer to receive calls (for which the temporary private number was dialed) only when those calls are initiated from a telephone set associated with the telephone number of the called party who was unavailable. In that case, only return calls originated from the telephone number stored in source number field 402-2 would reach the subscriber. Other parameters for different conditions may be stored in fields 402-3 to 403-N in the record of FIG. 4. Another field that could be included in the record of FIG. 4 may be, for example, a flag indicating whether a user pre-subscribed to distinctive ringing for "temporary number" incoming calls.

Referring back to FIG. 1, when signaling information associated with an outgoing call reaches central office switch 104, the originating telephone number for the call is determined from the routing table of FIG. 2, as described above. Thereafter, switch 104 checks the table of FIG. 3 to determine whether the derived originating telephone number is a subscriber of the privacy protection service. For non-subscribers, calls are completed in a conventional manner. An exemplary record for a non-subscriber is shown in the second row of FIG. 3. Users of the privacy protection service of the invention may elect to subscribe to the temporary private number identification service only (as shown in the record for the first row). Alternatively, users may prefer to subscribe to both the conversion service (described below) and the temporary private number service. An exemplary record for such a user is illustrated as the bottom row record of FIG. 3.

The privacy protection service of the invention is initiated when a caller at station 101, for example, dials the telephone number associated with telephone set 108. When central office switch 104 receives (via POTS line 120) the destination number for the call, it uses the routing table of FIG. 2 to map the line identification number of POTS line 120 to determine the originating telephone number for telephone set 101, as indicated in step 601. Switch 104 forwards the originating telephone number to adjunct processor 105 which proceeds to use that number to retrieve (from the table illustrated in FIG. 3) the record for that originating telephone number, as shown in step 602. As mentioned above, the record associated with an originating telephone number allows adjunct processor 105 to ascertain whether or not the call is initiated from the telephone set of a privacy protection service subscriber. If the call is originated from a non-subscribing line, as determined in steps 603, then the call is completed in a conventional manner, as indicated in step 613. If the call is initiated from a privacy protection subscribing line, as determined in step 603, adjunct processor 105, in step 604, randomly selects a number from the list of unassigned telephone numbers and stores the selected number in a temporary buffer. If conversion service was the only feature pre-subscribed by the user, as determined in step 605, adjunct processor 105, in step 606, replaces the contents of the calling party number field with the temporary private number selected from the list. If the temporary private number service was also pre-subscribed by the user, as determined in step 605, adjunct processor 105, in step 607, sends the number selected from the list to switch 104 which forwards that number (using ADSI protocols, for example) to telephone set 101 for display on unit 102.

In addition to the functions described above, adjunct processor 105 also determines from a retrieved record whether any user pre-selected restrictions are applicable to the use of the temporary private number. As indicated above, a user may want to impose certain restrictions on the use of the temporary private number for return calls. If no restrictions are applicable, as determined in step 608, adjunct processor 105, in step 612, returns the amended calling party number to switch 104 which routes the call to communications network 107, which in turn, completes the call to telephone set 108 in a conventional manner, as indicated in step 613. In that case, any return calls for which the temporary private number is the destination number are routed to Network Services Complex (NSC 117) which delivers an announcement to the caller to indicate that the dialed number is not in service.

When the record retrieved by adjunct processor 105 for the originating telephone number indicates that user-selected restrictions are applicable to the use of the temporary private number for return calls, adjunct processor 105, in step 609, removes the temporary private number from the list of unassigned numbers. This is done to prevent a caller from receiving a "Dialed Number is Out of Service" from Network Services Complex (NSC) 117 when the temporary private number is the destination number for the call. Adjunct processor 105 proceeds in step 610 to create a record in the table of FIG. 3 for that temporary private number. Specifically, adjunct processor 105 populates the different counters for the applicable restrictions for the temporary private number based on the pre-subscribed conditions' parameters selected by the calling party number from which the call originated. For example, if the record for the subscribing line indicates that the subscriber wants the temporary private number to be operative, for example, for no more than four calls originated from a telephone set associated with the called party number only, counter 402-1 of FIG. 4 is set for a maximum of four units and the called party number is copied to the source number in field 402-2. Adjunct processor 105, in step 611, forwards a message to switch 104 to update the customized routing block table illustrated in FIG. 4. Thereafter, adjunct processor 105, in step 612, returns the amended calling party number to the switch which subsequently completes the call in a conventional manner, as indicated in step 613. When no one is available to answer the call received by telephone set 108, the caller can use the temporary private number displayed on unit 102 as the return number for a message that the caller may elect to record on answering machine 110.

It is worth noting that a non-subscriber may dynamically invoke the features of the privacy protection service to request a temporary private number before completing a call to a called party. The service may be dynamically invoked, for example, by the caller entering a string of digits preceded by a special character, such as an asterisk or the pound sign. When a caller realizes that the called party is unavailable, the caller may enter, for example "*99" to trigger switch 104 and adjunct processor 105 to select a temporary private number that is returned to telephone set 101 for display on unit 102. The caller can then use the temporary private number as the return number in the message that the caller records on answering machine 110. At the end of the call, the caller could dial a telephone number, such as a toll-free number, to select restrictions for the use of the temporary private number. This may be implemented, for example, by using an interactive menu-based system that could prompt the user for the needed restrictions. Those restrictions may instruct switch 104 and adjunct processor 105 to honor calls, say, only once (or only some fixed number of times) or only between certain hours, to name a few restrictions.

Figure 7:
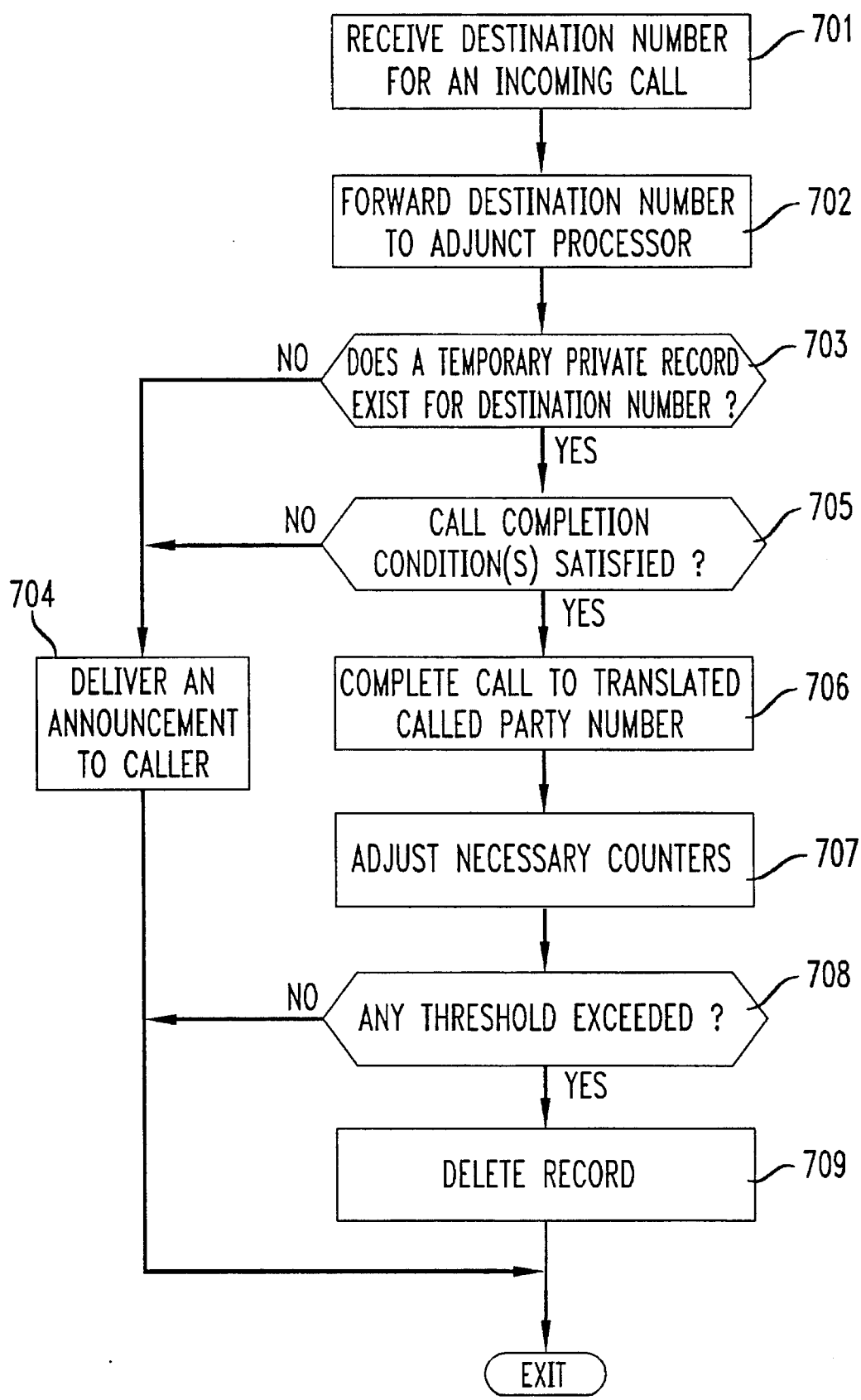

FIG. 7 shows in flow diagram format call processing instructions executed by different components of the network of FIG. 1 to allow processing of a call for which a temporary private number is the dialed number. This process is initiated in step 701 when switch 104 receives a destination number to complete an incoming call. Switch 104 uses the destination number to determine from the routing table illustrated in FIG. 2 the port number to which the call should be routed. When no match is found for that destination number, switch 104 "inters" that the received destination number is either a non-assigned telephone number or a temporary private number. Accordingly, switch 104 forwards the received destination number to adjunct processor 105, as indicated in step 702. Adjunct processor 105 then initiates a table lookup operation to match the received destination number to a temporary private number. When no match is found, as indicated in step 703, adjunct processor 105 sends a signaling message to switch 104 to instruct NSC 117, in step 704, to deliver an announcement to the caller informing him or her that the dialed number is not in service.

When a record exists in the table illustrated in FIG. 3, as determined in step 703, adjunct processor 105 analyzes the record to ascertain whether conditions pre-imposed on the use of that temporary private number are satisfied. If those conditions are not satisfied, as determined in step 705, adjunct processor 105 forwards a signaling message to switch 104 for the switch to instruct NSC 117 to deliver an announcement to the caller indicating that the dialed number is not in service. If, however, the conditions indicated in the record associated with the temporary private number are satisfied, then adjunct processor 105 brings the table of FIG. 5 into memory 106 to map the received destination number to the real telephone number in the customized routing block table of FIG. 5. Then, switch 104 uses the real telephone number to identify from the table of FIG. 2 the port number and the line identification number to complete the call, as indicated in step 706. Adjunct processor 105, in step 707, adjusts all necessary counters in the record illustrated in FIG. 4. A test is then conducted by adjunct processor 105, in step 708, to determine whether any threshold (for any counter associated with a restriction for the use of the temporary private number) has been exceeded. If so, adjunct processor 105, in step 709 deletes the record for that temporary private number that is subsequently added to the list of non-assigned numbers.

The foregoing is to be construed as only being an illustrative embodiment of this invention. Persons skilled in the art can easily conceive of alternative arrangements providing functionality similar to this embodiment without any deviation from the fundamental principles or the scope of this invention. By way of example, the randomly selected, non-assigned telephone number may be delivered to the caller in audible form if the caller does not have a caller-id display unit.

I claim:

1. In a communications system, a method of providing a communications service, said method comprising the steps of receiving information associated with a call initiated by a caller;

selecting a non-assigned telephone number for said communication service; and outputting a message identifying said non-assigned telephone number to said caller during said call.

2. The method of claim 1 wherein said information includes a calling party number and wherein said method further comprises the step of:

replacing the calling party number with the selected non-assigned telephone number for delivery to a called party number for which said call is destined.

3. The method of claim 1 further comprising the step of:

incorporating the selected non-assigned telephone number in a ringing signal delivered to a called party number for which said call is destined.

4. The method of claim 1 further comprising the step of:

delivering a first and a second ringing signal to a called party number for which said call is destined; and outputting said selected non-assigned telephone number to said called party number between said first and second ringing signal.

5. The method of claim 1 further comprising the step of:

completing said call to a called party number for which said call is destined; and in response to a signal from an answering machine at said called party number, outputting said selected non-assigned telephone number in audible form to said answering machine.

6. The method of claims 3, 4 or 5 further comprising the step of mapping said selected non-assigned telephone number to said caller's calling party number when the non-assigned telephone number is dialed for a return call directed to said calling party number.

7. The method of claim 6 further comprising the step of:

permitting said non-assigned telephone number to be mapped to said calling party number to complete a return call for which said selected non-assigned telephone number was dialed only if predetermined conditions are satisfied.

8. The method of claim 7 wherein at least one of said conditions is selected from a group which includes a) receiving return calls only from telephone sets associated with said called party number, b) limiting the number of calls directed to said selected non-assigned number, and c) limiting time period within which said selected non-assigned number can be used to complete calls to the calling party number.

9. The method of claim 7 further comprising the step of:

completing said return call to a voice announcement system when said predetermined conditions are not satisfied.

10. The method of claim 7 wherein said conditions are pre-selected by said caller.

11. The method of claim 7 wherein said conditions are selected by said caller after said call to said called party has been completed.

12. The method of claim 1 further including the steps of:

triggering said selection of said non-assigned number by entering at least one digit on a dialpad.

13. In a communications network, a method of processing a telephone call, said method comprising the steps of:

receiving a destination telephone number dialed by a caller who initiated said call;

determining by said network that said dialed telephone number is a non-assigned telephone number; and in response to determining that said dialed telephone number was previously used as a replacement number for a different telephone number, mapping said dialed number to said different telephone number.

14. The method of claim 13 further comprising the step of:

completing said call to said different telephone number when at least one condition which was pre-selected by a called party associated with said different telephone number is satisfied.

15. A system for providing a communications service to a caller, said system comprising:

means for receiving source information which includes a calling party number associated with said call; and means for replacing said calling party number with a selected non-assigned telephone number.

16. The system of claim 15 further comprising:

means for delivering said selected non-assigned telephone number to said caller.

17. The system of claim 15 further comprising:

means responsive to a signal from a voice messaging system at a called party number to which said call is directed, for delivering said selected non-assigned telephone number to said voice messaging system in audible form.

18. A system for processing an incoming call, said system comprising:

means for receiving a called party number for said call;

means for determining that said called party number is a non-assigned telephone number; and in response to determining that said called party number was previously used as a replacement number for a different telephone number, means for mapping said called party number to said different telephone number to complete said call.

19. The system of claim 18 further comprising:

means for completing said call to a voice message system when at least one condition that is pre-selected by said called party for receiving calls at said replacement number is not satisfied.

20. The system of claim 18 further comprising:

means for completing said call to said different telephone number when all conditions pre-selected by said caller are satisfied.

21. In a communications network, a method of providing a communications service to a caller placing a call, said method comprising the steps of:

receiving a calling party number and a called party number for said call;

selecting a non-assigned telephone number for said call; and replacing the calling party number with the selected non-assigned telephone number.

22. A method of providing a communications service to a caller placing a call, said method comprising the steps of:

determining a calling party number and a called party number for said call;

selecting a non-assigned telephone number for said call;

associating said selected non-assigned telephone number to said calling party number such that said non-assigned telephone number can be used as a telephone number at which said caller can be called back.

* * * * *